United States Patent [19]

Liu et al.

[11] 4,341,848
[45] Jul. 27, 1982

[54] BIFUNCTIONAL AIR ELECTRODES CONTAINING ELEMENTAL IRON POWDER CHARGING ADDITIVE

[75] Inventors: Chia-tsun Liu, Monroeville; Brian G. Demczyk, Rostrover Township, Westmoreland County; Paul R. Gongaware, Penn Township, Westmoreland County, all of Pa.

[73] Assignee: The United States of America as represented by the United States Department of Energy, Washington, D.C.

[21] Appl. No.: 240,659

[22] Filed: Mar. 5, 1981

[51] Int. Cl.³ .............................................. H01M 4/00
[52] U.S. Cl. ...................................... 429/27; 429/42; 429/44
[58] Field of Search ...................................... 429/27–29, 429/40, 42, 44, 46; 204/291, 294

[56] References Cited

U.S. PATENT DOCUMENTS

| 3,580,824 | 5/1971 | Currey et al. | 204/95 |
| 3,977,901 | 8/1976 | Buzzelli | 136/86 A |
| 4,152,489 | 5/1979 | Chottiner | 429/27 |

Primary Examiner—Charles F. LeFevour
Attorney, Agent, or Firm—D. P. Cillo

[57] ABSTRACT

A bifunctional air electrode for use in electrochemical energy cells is made, comprising a hydrophilic layer and a hydrophobic layer, where the hydrophilic layer essentially comprises a hydrophilic composite which includes:
 (i) carbon;
 (ii) elemental iron particles having a particle size of between about 25 microns and about 700 microns diameter;
 (iii) an oxygen evolution material;
 (iv) a nonwetting agent; and
 (v) a catalyst, where at least one current collector is formed into said composite.

10 Claims, 2 Drawing Figures

BIFUNCTIONAL AIR ELECTRODES CONTAINING ELEMENTAL IRON POWDER CHARGING ADDITIVE

GOVERNMENT CONTRACT

This invention was made or conceived in the course of or under Contract No. EY-76-C-02-2949, with the U.S. Government as represented by the Department of Energy.

BACKGROUND OF THE INVENTION

Bifunctional air or oxygen depolarization cells are generally well known in the art. Electro-chemical cells of this type include a gas diffusion electrode capable of generating electricity by electro-chemically combining an oxidizable reactant with a reducible reactant. Generally, these electro-chemical cells are comprised of spaced apart electrodes ionically connected by an electrolyte.

Illustrative of these types of cells and electrodes is Buzzelli, U.S. Pat. No. 3,977,901, herein incorporated by reference. In that patent, particular types of low surface area carbon black materials were used to help solve problems of electrolyte permeability. Other components used in the electrodes of that patent included 0.5 to 4 parts, per 1 part of carbon, of an oxygen evolution material, such as WC, and effective amounts of both a bonding/nonwetting agent and a catalyst for oxygen reduction and decomposition of perhydroxides, such as silver.

Such electrodes were found to have third cycle charging potentials of about 550 mV. to 610 mV. vs. a Hg/HgO reference electrode. Values of about 550 mV. to 585 mV. were achieved by using major amounts of oxygen evolution material, such as WC, adding substantially to the cost and weight of the electrode. It is desirable to lower this charging voltage, to conserve energy, and to reduce the amount of silver catalyst that dissolves in the electrolyte at that voltage. It is also desirable to reduce the cost and weight of the above-described types of electrodes, while maintaining a proper balance of electrolyte permeability.

In another art area, relating to graphite anodes used in the electrolysis of aqueous alkali metal halide electrolyte, Curry et al., in U.S. Pat. No. 3,580,824, taught vacuum impregnating a graphite anode with ferric or ferrous chloride, nitrate, acetate or formate, and then calcining the impregnated graphite for up to 4 hours at 800° C. to 2,000° C. in an inert atmosphere, to produce varying amounts of alpha-iron and alpha-$Fe_2O_3$, in-situ in the graphite pores. The iron is used partly as a substitute for an oil impregnant, to reduce the consumption of the anode during cell operation, the iron apparently preventing wetting of the interior of the anode by the liquid electrolyte. Such a process would make the electrode substantially electrolyte impermeable.

SUMMARY OF THE INVENTION

The present invention is directed to a novel bifunctional electrode for use in metal/air battery systems. Generally, the bifunctional air electrode of the present invention includes a hydrophilic layer comprising an expanded metal, wire screen, or preferably, a fiber metal current collector inert to electrolyte, and preferably fabricated from nickel, or nickel plated steel, intimately contacted by a hydrophilic material.

A hydrophobic layer is then press bonded to the hydrophilic layer. The composite air electrode is then suitably framed in a material that is corrosion resistant to the alkaline electrolyte, such as an ABS plastic. The air electrode is positioned within the cell so that the hydrophobic material is in contact with either air or oxygen, and the hydrophilic material is in contact with an alkali hydroxide electrolyte such as NaOH, KOH or LiOH.

The components for the hydrophilic material of the bifunctional electrode are mixed together in a weight ratio of about 1 part by weight of carbon having a surface area of between about 30 and about 1,500 sq. meters/gram, where at least about 50 wt. % of the carbon has a low surface area of between about 30 and about 300 sq. meters/gram; about 0.1 to about 1.0 part of elemental iron particles having a particle size range of between about 25 microns to about 700 microns diameter; when silver is used as a catalyst, about 0.05 to about 1.0 part of a metal sulfide, preferably nickel sulfide as a silver protection additive; an effective amount, usually about 0.01 to about 1.0 part by weight catalyst; 0.0 to about 1.0 part by weight of $CoWO_4$, WC, $WS_2$, or WC with 1 to 20 wt. % Co., and their mixtures; and an amount of nonwetting agent effective to bond the other components together and prevent electrolyte flooding, usually about 0.15 to about 3 parts by weight, as powder having a preferred particulate size range of about 0.2 to about 40 microns. As an initial step, if silver is to be used as the catalyst, the carbon particles are silverized by precipitating Ag on the carbon, via the addition of $AgNO_3$ to an aqueous slurry of carbon in the presence of hydrazine ($NH_2NH_2$).

To this mixture a sufficient amount of distilled water is added to provide a material having a paste-like consistency. This paste can be dried somewhat and then pressed into a hydrophilic layer, after which it can be pressed into the current collector. By another method, the paste is spread over and forced into a suitable current collector, to integrate the current collector into a composite structure as a first step. The structure is then air dried and pressed to form the hydrophilic layer.

The hydrophilic layer is then bonded to a layer of hydrophobic material that is impervious to the electrolyte, but capable of permitting air and oxygen diffusion therethrough. Preferably, the gas permeable, alkaline liquid impermeable hydrophobic layer will comprise porous polytetrafluoroethylene, fluorinated ethylene propylene, and carbon particles.

The bifunctional metal/air battery of the present invention comprises at least one bifunctional air electrode as described above, having the hydrophobic layer in contact with a source of oxygen or air, such as the atmosphere. A metal (fuel) electrode made of iron, cadmium, zinc, or the like is spaced apart from the air electrode and ionically connected by an alkali hydroxide electrolyte, preferably KOH.

The bifunctional air electrode of this invention is lightweight and inexpensive because elemental iron is used to replace some or all of the oxygen evolution material, such as WC. The bifunctional air electrode of this invention maintains a proper balance of electrolyte permeability, due to the elemental iron providing an electrolyte storage surface, and allows third cycle charging potentials of about 510 mV. to 575 mV. vs. a Hg/HgO reference electrode, conserving energy and catalyst costs. In addition, if silver is used as the catalyst, the metal sulfide reacts with the catalyst to form a compound relatively insoluble in the alkali electrolyte, thus further conserving catalyst costs.

BRIEF DESCRIPTION OF THE DRAWINGS

For a better understanding of the invention, reference may be made to the preferred embodiments exemplary of the invention, shown in the accompanying drawings, in which.

DESCRIPTION OF THE PREFERRED EMBODIMENTS

Figure 1:
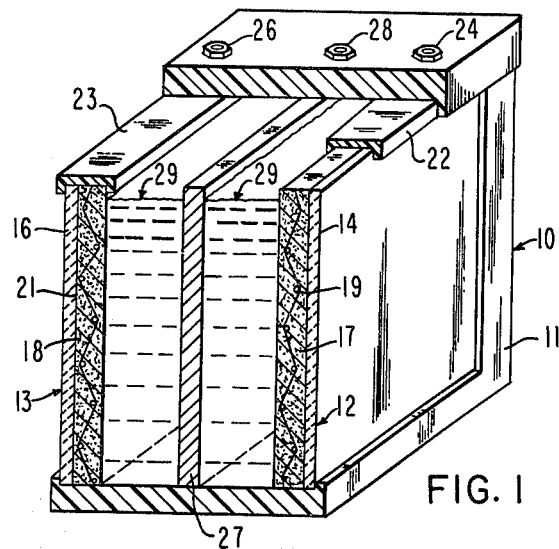
FIG. 1 is an isometric view, in partial section of one embodiment of an air/metal battery of the present invention.

With reference to FIG. 1, battery 10 is a general representation of the bifunctional metal/air cells of the present invention. Metal/air cell 10 includes a casing 11 for support of the air electrode and fuel electrode as well as the electrolyte. Preferably, casing 11 is fabricated from ABS plastic or other non-conducting material that is stable or resistant to the electrolyte and reaction products, typically oxygen and hydrogen. Cell 10 comprises a pair of bifunctional air electrodes 12 and 13 each having an outer hydrophobic layer 14 and 16, respectively, each of which is in contact with the atmosphere or other source of air or oxygen. Air electrodes 12 and 13 also include hydrophilic layers 17 and 18, respectively, including integrally contained metal current collectors 19 and 21. Electrodes 12 and 13 are framed in frames 22 and 23, preferably made from ABS plastic and having electrical leads 24 and 26, respectively.

Metal/air cell 10 includes a fuel electrode 27, preferably fabricated from iron, cadmium, zinc, or the like material, preferably iron, spaced between air electrodes 12 and 13 and including electrical lead 28. Metal/air cell 10 also includes an electrolyte 29 between and in contact with metal electrode 27 and air electrodes 12 and 13, respectively. Electrolyte 29 is an alkali hydroxide, such as sodium hydroxide, lithium hydroxide, or preferably potassium hydroxide.

Figure 2:
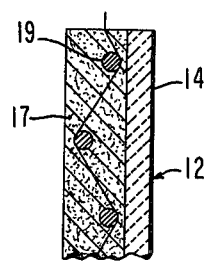
FIG. 2 is an enlarged sectional elevation of one embodiment of the bifunctional air electrode of the present invention, useful in electrochemical energy cells.

With reference to FIG. 2, the bifunctional air electrode 12 is shown with hydrophilic layer 17 and hydrophobic layer 14 pressed and bonded thereto. Current collector 19 is intimately contacted by and generally disposed within and impregnated by hydrophilic layer 17, and is adapted for electrical connection to the circuit. In the present invention, the hydrophilic layer is about 5 to 100 mils and preferably about 10 to 50 mils in thickness and the hydrophobic layer is about 5 to 50 mils thick. Generally, it has been found that the life of an air electrode increases with an increase in the thickness of the hydrophilic layer. However, any increase greater than about 100 mils is undesirable because of the increase in weight to the cell.

Hydrophilic layers 17 and 18 comprise a composite of four or five components and an integral current collector. This hydrophilic composite when used in a bifunctional electrode must include a low surface area oxygen absorption and reduction material such as carbon black. Preferably, the carbon is in a fluffy form comprising discrete particles in a chain like structure, such as Shawinigan acetylene black, having a low surface area of about 30 to about 300 square meters per gram, as described in U.S. Pat. No. 3,977,901. The carbon also may comprise a mixture of low surface area acetylene black carbon, and, for example, furnace carbon black, preferably in a fluffy form comprising discrete particles, having a surface area of about 80 to about 1,500 square meters per gram. The low surface area carbon, such as acetylene black, must comprise from about 50 wt. % to 100 wt. %, preferably from about 65 wt. % to 100 wt. % of the carbon used.

By surface area is meant the total external area/gram. The porous nature of carbon excludes surface area measurement by microscopial examination, which would give only the external surface. Consequently, indirect methods are used, which include measurements based on absorption isotherms, such as the standard method of Burnauer, Emmett and Teller (BET), or mercury intrusion porosity measurements.

It has been found that only certain combinations of carbon will work in the hydrophilic layer of the bifunctional electrode of this invention. The carbon acts as a surface to evolve oxygen during charging in aqueous alkaline electrolyte, according to the reaction

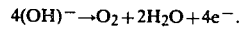

$$4(OH)^- \rightarrow O_2 + 2H_2O + 4e^-.$$

Unactivated, fluffy type acetylene black carbon, having a surface area of about 70 sq. meters/gram, and a particle size diameter range of between about 0.005 to about 0.13 micron is particularly effective to evolve oxygen without deleterious effects on the electrode.

With reference again to FIG. 2, in the bifunctional air electrode 12 shown, the air penetrates by diffusion to a three phase zone which is a narrow electrochemically active zone where the $O_2$, liquid electrolyte and solid carbon particles meet. A catalyst is usually also present. The most effective interface is at the current collector 19. Useful catalysts include silver, which is preferred, platinum, platinum-ruthenium, nickel spinel, nickel perovskites, and iron, nickel or cobalt macrocyclics, among others. The catalyst is effective for the reduction of oxygen and the decomposition of intermediate reaction products, typically perhydroxides.

In addition, a low oxygen evolution material may be used. This material helps to decrease oxygen over-voltage. Compounds found suitable for use as this component include $CoWO_4$, WC, $WS_2$, and WC containing about 1 to 20 but preferably 10 to 15 wt. % fused cobalt, and their mixtures. In this latter material, the cobalt is generally fuse sintered onto tungsten carbide particles. A nonwetting agent to prevent gross flooding of the electrode by the electrolyte and to bond the composite together is required. The nonwetting agent includes at least polytetrafluoroethylene, and preferably comprises a blend of fibrillated polytetrafluoroethylene and fluorinated ethylene propylene.

The elemental iron component consists of substantially pure iron particles (Fe°). This material can be easily produced from ferric oxide ($Fe_2O_3$), which is an inexpensive, commercially available material. The $Fe_2O_3$ can be thermally reduced to metallic iron, Fe°, at about 750° C. in a reducing atmosphere, preferably $H_2$, for about 20 minutes. It can then be ground or otherwise pulverized to a powder having a critical particle size range of between about 25 microns and about 700 microns. Over 700 microns, —electrode flooding will result. Under 25 microns, the electrode will lack sufficient porosity.

The elemental iron functions to reduce oxygen evolution overvoltage. The iron provides a highly porous surface for effective electrolyte storage, while simultaneously acting as an electron conductor. As such it allows controlled penetration of electrolyte to the metallic current collecting grids where oxygen is formed on carbon surfaces, thus facilitating the oxygen evolution process. Thus, the use of elemental iron enables either partial or total replacement of scarce, expensive, high density oxygen evolution materials, such as WC, resulting in lower weight, less expensive electrodes.

A silver protection additive can also be used when silver is the catalyst used in the hydrophilic layer. Metal sulfides, such as iron sulfide, cobalt sulfide, and preferably nickel sulfide are effective. The $S^{2-}$ reacts with the silver to form $Ag_2S$, which is relatively insoluble in alkali hydroxide electrolytes. Other catalysts such as platinum are inert in such electrolytes and present no dissolution problems. They are not preferred as the catalyst however, because relative to silver, they are very expensive.

The weight ratios of ingredients for the hydrophilic layer are: 1 part by weight of oxygen absorption/reduction carbon having a surface area of between about 30 sq. meters/gram and about 1,500 sq. meters/gram and a particle size diameter range of between about 0.005 micron and about 0.13 micron, where at least about 50 wt. % of the carbon has a low surface area of between about 30 and about 300 sq. meters/gram, about 0.1 to about 1.0 part of elemental iron ($Fe°$) particles having a particle size of between about 25 microns and about 700 microns diameter; an effective amount, usually about 0.01 to about 1.0 part of a catalyst for oxygen reduction and decomposition of perhydroxides, such as silver, platinum, platinum-ruthenium and the like and their mixtures; when silver is used as a catalyst, about 0.05 to about 1.0 part of a metal sulfide, preferably nickel sulfide as a silver protection additive; up to about 1.0 part, i.e., 0.0 to 1.0 part of an oxygen evolution material selected from $CoWO_4$, $WS_2$, WC, WC fuse sinter coated with 1 to 20 wt. % Co, and their mixtures; and an effective amount, usually about 0.15 to about 3 parts, of a bonding/nonwetting agent including at least polytetrafluoroethylene, and having a preferred particle size range of about 0.2 micron to about 40 microns. The addition range of $Fe°$ is critical to this invention, under about 0.1 part/1 part carbon will result in a high charging potential, over about 1.0 part/1 part carbon will cause electrode flooding.

As a first step, if silver is to be used as the catalyst, the carbon particles are silverized by precipitating Ag on the carbon, via the addition of $AgNO_3$ to an aqueous slurry of carbon in the presence of hydrazine ($NH_2NH_2$). This produces colloidal silver particles of about 5 Angstrom to 30 Angstrom units diameter adhering to the carbon particles. The components can then be mixed together with distilled water to a paste-like consistency. In the wet-pasting method, the composition is spread over and through electrode current collectors, shown in the drawings as 19 and 21, each preferably formed as an array of nickel or nickel plated steel fibers sintered together generally below the melting point of the fibers to form a plaque with a theoretical density of about 5% to 15%, i.e. about 85% to 95% porous at a thickness of 12 to 15 mils.

The air electrodes of this invention can consist of a single layer of pasted current collector, as shown in FIG. 2, but more commonly they consist of a plurality, usually two or three, impregnated layers of pasted current collectors bonded together, i.e., the hydrophilic layer comprises at least one and usually two or three current collectors sandwiched within the hydrophilic layer material.

The composition is permitted to air dry and thereafter the layers of pasted current collectors are subjected to a flat-bed pressing at a temperature between 250° C. and 400° C. at a pressure of between 0.25 and 3 tons/sq. inch, to consolidate the layers into a single air electrode. In the preform method of forming the air electrode, the paste is dried, and then preformed into a hydrophilic layer at 25° C. and 0.5 to 2 ton/sq. inch, followed by pressing into the current collector at the same temperature and pressure, followed by hot pressing at about 250° C. and 0.5 to 3 ton/sq. inch. In either case the current collector is "formed" into the composite to provide a hydrophilic layer.

The pressing operating affects the quality of the air electrode and it is required that the above described temperature and pressure be adhered to for the best results. Use of temperatures, over 400° C. would burn off the bonding/non-wetting agent, leaving an unbound structure. The resulting hydrophilic layer has a preferred thickness of from 10 to 50 mils.

Hydrophobic layers 14 and 16 can comprise a sheet of porous, unsintered, fibrillated polytetrafluoroethylene alone, or in combination with fluorinated ethylene propylene and carbon particles. Preferably, the hydrophobic layers will comprise porous fluorinated ethylene propylene, polytetrafluoroethylene and carbon particles, where the carbon particles constitute from about 20 wt.% to about 75 wt.% of the hydrophobic layer. While other methods of attaching hydrophobic layers 14 and 16 to hydrophilic layers 17 and 18 are suitable, it is preferred that they be press laminated at the same time as the hydrophilic layer is pressed, using the same temperature and pressure as heretofore described. They can also be roll laminated, where both layers are first heated at a temperature of about 300° C. for about 10 minutes and then are passed through a two roll mill, where the roll surfaces are maintained at a temperature of about 190° C. with a pressure therebetween of about 25 psi.

EXAMPLE 1

Five bifunctional air electrode samples were fabricated using 2 and 3 current collectors of either nickel fiber or iron fiber construction, and varying amounts of: fluffy acetylene black carbon (C), sold by Shawinigan Products Corp. consisting primarily of substantially discrete connected particles having a particle size diameter between about 0.02 and 0.1 micron and having a surface area of about 40 to 90 sq. meters/gram; tungsten carbide fuse coated with 12 wt.% cobalt; fluorinated ethylene propylene (FEP) and polytetrafluoroethylene (PTFE) bonding/nonwetting agents; silver nitrate to provide silver catalyst; nickel sulfide; and elemental iron ($Fe°$) having a particle size of between 57 microns and 500 microns diameter, as shown below in Table 1:

| Sample | # of Conductors | ACTIVE MATERIAL | | | | | | | | RATIO C:Fe° | CHARGING POTENTIAL mV* |
|---|---|---|---|---|---|---|---|---|---|---|---|
| | | gr C | gr FEP | gr PTFE | gr AgNo₃ | gr Ag precip. | gr WC + 12 wt. % Co | gr Fe° | gr NiS | | |
| 1 | 2 Ni fiber | 1.22 | 0.23 | 0.14 | 0.10 | 0.06 | 0.41 | 0.5 | 0.51 | 1:0.41 | 563 |
| 2 | 3 Ni fiber | 1.95 | 0.37 | 0.22 | 0.15 | 0.10 | 0.63 | 0.6 | 0.73 | 1:0.31 | 538 |
| 3 | 3 Ni fiber | 1.95 | 0.37 | 0.22 | 0.15 | 0.10 | 0.63 | 0.7 | 0.73 | 1:0.36 | 542 |
| 4 | 2 steel fiber | 1.46 | 0.28 | 0.17 | 0.10 | 0.06 | 0.44 | 1.0 | 0.44 | 1:0.68 | 570 |
| 5 | 3 steel fiber | 2.19 | 0.42 | 0.25 | 0.15 | 0.10 | 0.66 | 1.5 | 0.66 | 1:0.69 | 516 |

*After third cycle (mV. vs. Hg/HgO reference)

Initially, silverized carbon was prepared by precipitating finely divided Ag on the carbon particles in the presence of $NH_2NH_2$ via the addition of $AgNO_3$ to a wet carbon slurry. Excess water was vacuum filtered from the slurry and the resulting paste was air dried for about 16 hours. The dried silverized carbon powder was then homogenerously mixed with fluorinated ethylene propylene, a 60 wt.% solids dispersion of polytetrafluoroethylene, cobalt coated tungsten carbide, and nickel sulfide. The material was then oven dried at 100° C. to form a fine flowing powder, after which the elemental iron was added, and then the resulting material was mixed in a ball mill for about 1 hour. The dry powders were dry pressed at 25° C. and about 1 ton/sq. inch to provide unitary sheets of hydrophilic material. These sheets were then placed on the nickel fiber or steel wool current collectors, to provide the configurations desired, and pressed at 25° C. and about 1 ton/sq. inch., forcing the hydrophilic material into the current collectors. At this point the current collectors were disposed within and encapsulated by the hydrophilic material.

The hydrophilic layers of Samples 1, 2 and 3 were hot bonded to hydrophobic layers at about 350° C. and about 5 tons/sq. inch for 10 minutes, to form bifunctional air electrodes. The hydrophilic layers of Samples 4 and 5 were bonded to hydrophobic layers at 25° C. and about 8 tons/sq. inch, followed by a 30 minute bake in a $N_2$ atmosphere at 325° C. The hydrophobic layer consisted of a pressed sheet of 71.5 wt.% Shawinigan acetylene black carbon, 14.25 wt.% fluorinated ethylene propylene and 14.25 wt.% polytetrafluoroethylene.

All of these bifunctional air electrodes were fully cycled in a 25% KOH aqueous solution at 25° C. against a Ni sheet counter electrode. Cells were run using unscrubbed air, and electrolyte level within the cell casing was maintained via a siphon tube arrangement. Potentials were measured relative to a Hg/HgO reference electrode. During the discharge ($O_2$ reduction) mode, electrodes were operated at a current density of 25 mA/cm² for four hours. Charging was accomplished at a current density of 12.5 mA/cm², also for four hours. Once a week, electrodes were polarized in the discharge mode over a current density range of 6.25–125 mA/cm². The measured charging potential for each sample electrode after three cycles is shown in Table 1 above. The average value was 546 mV. Electrodes of this same type were subsequently placed in iron-air batteries, somewhat similar to that shown in FIG. 1 of the drawings, and exhibited above average energy efficiency.

COMPARATIVE EXAMPLE 2

As a comparative example, two bifunctional air electrode samples were prepared, not containing any elemental iron. These electrode samples both used 3 nickel fiber current collectors and both contained: 2.94 gr. acetylene black carbon having a particle size diameter between about 0.02 and 0.1 micron and having a surface area of about 40 to 90 sq. meters gram; 0.61 gr. tungsten carbide fuse coated with 12 wt.% cobalt; 0.38 gr. fluorinated ethylene propylene and about 0.28 gr. polytetrafluoroethylene bonding/nonwetting agent; 0.13 gr. silver nitrate providing about 0.08 gr. silver catalyst; 0.66 gr. nickel sulfide; and no iron (Fe°). The electrode material was prepared and bonded to the current collectors the same way as described in Example 1. The hydrophobic layer consisted of a pressed sheet similar to that described on Example 1. This bifunctional air electrode was cycled and run as described in Example 1. Potentials were measured as described in Example 1 with the resulting third cycle charging potential values of 604 mV and 605 mV measured vs. a Hg/HgO reference.

As can be seen from the results of Table 1, where the average charging potential of the elemental iron containing air electrodes was 546 mV; a very substantial improvement in oxygen evolution potential results from utilizing Fe° powder within the ranges described above. In addition, less low oxygen evolution materials, such as WC, need be used, lowering both the cost and weight of the air electrode.

We claim:

1. A bifunctional air electrode for use in electrochemical energy cells comprising:
   A. a hydrophilic layer consisting essentially of:
      (1) a hydrophilic composite comprising:
         i. about 1 part by weight of carbon particles having a total surface area of from about 30 to about 1,500 sq. meters/gram, where at least about 50 wt.% of the carbon particles have a total surface area of from about 30 to about 300 sq. meters/gram;
         ii. about 0.1 to about 1 part by weight of elemental iron particles having a particle size of between about 25 microns and about 700 microns diameter;
         iii. up to about 1 part by weight of an oxygen evolution material;
         iv. an effective amount of a bonding/nonwetting agent; and
         v. an effective amount of a catalyst for oxygen reduction and decomposition of perhydroxides; and
      (2) at least one metal current collector formed into said composite to provide a hydrophilic layer, and
   B. a hydrophobic layer pressed to said hydrophilic layer.

2. The electrode of claim 1, wherein the current collector is a metal fiber current collector.

3. The electrode of claim 1, wherein said hydrophilic composite is substantially flat, the catalyst is silver, and an effective amount of metal sulfide is included in the hydrophilic composite as a silver protective additive.

4. A metal/air cell comprising a metal electrode selected from the group consisting of iron, zinc, and cadmium; at least one air electrode as set forth in claim 1 spaced apart from said metal electrode; and an alkali hydroxide electrolyte in contact with said metal and air electrode.

5. A bifunctional air electrode for use in electrochemical energy cells capable of non-destructive charging comprising:
   A. a hydrophilic layer consisting essentially of:
      (1) a hydrophilic composite comprising:
         i. about 1 part by weight of oxygen absorption/reduction carbon particles having a particle size range of between about 0.005 to 0.13 micron and a total probable surface area of from about 30 to about 1,500 sq. meters/gram, where at least about 50 wt.% of the carbon particles have a total surface area of from about 30 to about 300 sq. meters/gram;
         ii. about 0.1 to about 1 part by weight of elemental iron particles having a particle size of between about 25 microns and about 700 microns diameter;
         iii. up to about 1 part by weight of an oxygen evolution material selected from the group consisting of $CoWO_4$, $WS_2$, WC, WC fuse sinter coated with 1–20 wt.% Co, and mixtures thereof;
         iv. an effective amount of bonding/non-wetting agent including at least polytetrafluoroethylene; and
         v. an effective amount of a catalyst for oxygen reduction and decomposition of perhydroxides; and
      (2) at least one metal current collector formed into said composite to provide a hydrophilic layer; and
   B. A hydrophobic layer pressed to said hydrophilic layer.

6. The air electrode as set forth in claim 5, wherein the current collector is a metal fiber current collector.

7. The air electrode of claim 5, wherein said hydrophilic composite is substantially flat, the catalyst is silver, and an effective amount of metal sulfide is included in the hydrophilic composite as a silver protective additive.

8. A metal/air cell comprising a metal electrode selected from the group consisting of iron, zinc, and cadmium; at least one air electrode as set forth in claim 5 spaced apart from said metal electrode; and an alkali hydroxide electrolyte in contact with said metal and air electrode.

9. A metal/air battery comprising a metal electrode at least one bifunctional air electrode, effective to allow non-destructive battery charging spaced apart from said metal electrode, the bifunctional air electrode comprising:
   A. a hydrophilic layer consisting essentially of:
      (1) a hydrophilic composite comprising:
         i. about 1 part by weight of carbon particles having a total surface area of from about 30 to about 1,500 sq. meters/gram, where at least about 50 wt.% of the carbon particles have a total surface area of from about 30 to about 300 sq. meters/gram;
         ii. about 0.1 to about 1 part by weight of elemental iron particles having a particle size of between about 25 microns and about 700 microns diameter;
         iii. up to about 1 part by weight of an oxygen evolution material;
         iv. an effective amount of bonding/nonwetting agent; and
         v. an effective amount of a catalyst for oxygen reduction and decomposition of perhydroxides; and
      (2) at least one metal current collector formed into said composite to provide a substantially flat hydrophilic layer; and
   B. a hydrophobic layer pressed to said hydrophilic layer; and an alkali hydroxide electrolyte in contact with said metal electrode and the hydrophilic layer of said bifunctional air electrode.

10. The metal/air battery of claim 9, wherein the current collector is a metal fiber current collector, the catalyst is silver, and an effective amount of metal sulfide is included in the hydrophilic composite as a silver protective additive.

* * * * *